(12) United States Patent
Chen et al.

(10) Patent No.: US 10,275,208 B2
(45) Date of Patent: Apr. 30, 2019

(54) APPARATUS AND METHODS OF DELIVERING MUSIC AND INFORMATION

(71) Applicant: Callahan Cellular L.L.C., Wilmington, DE (US)

(72) Inventors: Alexander C. Chen, Newport Beach, CA (US); Sanjivpal S. Gill, Fountain Valley, CA (US)

(73) Assignee: Callahan Cellular L.L.C., Wilmington, DE (US)

( * ) Notice: Subject to any disclaimer, the term of this patent is extended or adjusted under 35 U.S.C. 154(b) by 0 days.

(21) Appl. No.: 15/134,292

(22) Filed: Apr. 20, 2016

(65) Prior Publication Data

US 2016/0306605 A1     Oct. 20, 2016

Related U.S. Application Data

(63) Continuation of application No. 13/966,224, filed on Aug. 13, 2013, now Pat. No. 9,350,788, which is a
(Continued)

(51) Int. Cl.
*G06F 3/16*     (2006.01)
*G06F 17/30*    (2006.01)
(Continued)

(52) U.S. Cl.
CPC ............ *G06F 3/165* (2013.01); *G06F 3/0489* (2013.01); *G06F 3/167* (2013.01);
(Continued)

(58) Field of Classification Search
USPC .......................................................... 379/81
See application file for complete search history.

(56) References Cited

U.S. PATENT DOCUMENTS

| 4,887,308 A | 12/1989 | Dutton |
| 5,132,992 A | 7/1992 | Yurt et al. |

(Continued)

FOREIGN PATENT DOCUMENTS

| EP | 1126662 B1 | 3/2007 |
| WO | 2001053970 | 7/2001 |

OTHER PUBLICATIONS

"Sharp: Sharp releases MD-SS323 portable MiniDisc player." MS Presswire, Mar. 30, 1999, 4 pages.
(Continued)

*Primary Examiner* — Amal S Zenati
(74) *Attorney, Agent, or Firm* — Perkins Coie LLP

(57) ABSTRACT

The invention comprises music and information delivery systems and methods. One system comprises a portable communication device configured to receive a piece of music from an audio source and transmit the piece of music via a first communication medium to a host computer. The host computer is configured to receive the piece of music from the portable communication device and search a storage medium to identify and access the piece of music from the storage medium. The host computer is configured to transmit the piece of music via a second communication medium to one or more reception units that are configured to receive the piece of music from the host computer via the second communication medium.

18 Claims, 8 Drawing Sheets

Related U.S. Application Data continuation of application No. 12/075,261, filed on Mar. 11, 2008, now Pat. No. 8,509,397, which is a continuation of application No. 09/567,848, filed on May 9, 2000, now Pat. No. 7,444,353.

(60) Provisional application No. 60/179,256, filed on Jan. 31, 2000, provisional application No. 60/182,309, filed on Feb. 9, 2000.

(51) Int. Cl.
*H04L 29/08* (2006.01)
*G06F 3/0489* (2013.01)
*G10L 25/60* (2013.01)

(52) U.S. Cl.
CPC .. *G06F 17/30743* (2013.01); *G06F 17/30746* (2013.01); *G06F 17/30749* (2013.01); *G06F 17/30758* (2013.01); *G10L 25/60* (2013.01); *H04L 67/02* (2013.01); *Y10S 707/99945* (2013.01); *Y10S 707/99948* (2013.01)

(56) References Cited

U.S. PATENT DOCUMENTS

| | | |
|---|---|---|
| 5,134,719 A | 7/1992 | Mankovitz |
| 5,161,251 A | 11/1992 | Mankovitz |
| 5,170,381 A | 12/1992 | Taylor et al. |
| 5,276,810 A | 1/1994 | Kitamura et al. |
| 5,526,284 A | 6/1996 | Mankovitz |
| 5,539,635 A | 7/1996 | Larson, Jr. |
| 5,572,442 A | 11/1996 | Schulhof et al. |
| 5,577,266 A | 11/1996 | Takahisa et al. |
| 5,581,576 A | 12/1996 | Lanzetta et al. |
| 5,581,658 A | 12/1996 | O'Hagan et al. |
| 5,589,818 A * | 12/1996 | Queen ............ H04M 11/04 340/506 |
| 5,625,608 A | 4/1997 | Grewe et al. |
| 5,661,787 A | 8/1997 | Pocock |
| 5,691,494 A | 11/1997 | Sai et al. |
| 5,703,308 A | 12/1997 | Tashiro et al. |
| 5,728,960 A | 3/1998 | Sitrick |
| 5,734,119 A | 3/1998 | France et al. |
| 5,734,719 A | 3/1998 | Tsevdos et al. |
| 5,739,451 A | 4/1998 | Winksy et al. |
| 5,742,893 A | 4/1998 | Frank |
| 5,819,160 A | 10/1998 | Foladare et al. |
| 5,824,934 A | 10/1998 | Tsurumi et al. |
| 5,848,163 A | 12/1998 | Gopalakrishnan et al. |
| 5,864,868 A | 1/1999 | Contois |
| 5,874,686 A | 2/1999 | Ghias et al. |
| 5,918,223 A | 6/1999 | Blum et al. |
| 5,949,886 A * | 9/1999 | Nevins ............ H03G 3/32 381/104 |
| 5,959,945 A | 9/1999 | Kleiman |
| 5,963,957 A * | 10/1999 | Hoffberg ............ G06F 17/30017 369/13.11 |
| 5,974,387 A | 10/1999 | Kageyama et al. |
| 5,986,200 A | 11/1999 | Curtin |
| 5,991,737 A | 11/1999 | Chen |
| 6,022,223 A | 2/2000 | Taniguchi et al. |
| 6,025,255 A * | 2/2000 | Chen ............... H01L 21/31116 257/E21.252 |
| 6,121,530 A | 9/2000 | Sonoda |
| 6,137,784 A * | 10/2000 | Wallerius ............ H04B 7/022 370/328 |
| 6,201,176 B1 | 3/2001 | Yourlo |
| 6,212,555 B1 | 4/2001 | Brooks, Jr. et al. |
| 6,300,880 B1 | 10/2001 | Sitnik |
| 6,317,784 B1 | 11/2001 | Mackintosh et al. |
| 6,366,791 B1 | 4/2002 | Lin et al. |
| 6,411,928 B2 * | 6/2002 | Tsurufuji ............ G10L 15/20 704/226 |
| 6,425,018 B1 | 7/2002 | Kaganas et al. |
| 6,434,520 B1 | 8/2002 | Kanevsky et al. |
| 6,484,199 B2 | 11/2002 | Eyal |
| 6,529,602 B1 | 3/2003 | Walker et al. |
| 6,570,080 B1 | 5/2003 | Hasegawa et al. |
| 6,578,047 B1 | 6/2003 | Deguchi |
| 6,615,172 B1 | 9/2003 | Bennett et al. |
| 6,662,022 B1 | 12/2003 | Kanamori et al. |
| 6,691,149 B1 | 2/2004 | Yokota et al. |
| 6,925,489 B1 | 8/2005 | Curtin |
| 6,941,275 B1 | 9/2005 | Swierczek |
| 6,954,652 B1 | 10/2005 | Sakanashi |
| 7,022,905 B1 | 4/2006 | Hinman et al. |
| 7,065,342 B1 | 6/2006 | Rolf |
| 7,110,838 B1 | 9/2006 | Tada |
| 7,174,293 B2 | 2/2007 | Kenyon et al. |
| 7,194,752 B1 | 3/2007 | Kenyon et al. |
| 7,197,495 B2 | 3/2007 | Deguchi et al. |
| 7,219,123 B1 | 5/2007 | Fiechter et al. |
| 7,251,475 B2 | 7/2007 | Kawamoto |
| 7,257,536 B1 | 8/2007 | Finley et al. |
| 7,277,766 B1 | 10/2007 | Khan et al. |
| 7,333,957 B2 | 2/2008 | Levy et al. |
| 7,444,353 B1 | 10/2008 | Chen et al. |
| 7,870,088 B1 | 1/2011 | Chen et al. |
| 8,509,397 B2 | 8/2013 | Chen et al. |
| 9,350,788 B2 | 5/2016 | Chen et al. |
| 2002/0010759 A1 | 1/2002 | Hitson et al. |
| 2005/0091268 A1 | 4/2005 | Meyer et al. |

OTHER PUBLICATIONS

"Name That Tune, Then Sell It Via Wireless," Mobile Phone News, May 31, 1999, vol. 17, 2 pages.
United States Patent and Trademark Office, Restriction Requirement, U.S. Appl. No. 09/567,848, dated Jun. 3, 2003, 4 pages.
United States Patent and Trademark Office, Non-Final Office Action, U.S. Appl. No. 09/567,848, dated Jul. 16, 2003, 10 pages.
United States Patent and Trademark Office, Non-Final Office Action, U.S. Appl. No. 09/567,848, dated Sep. 25, 2003, 9 pages.
United States Patent and Trademark Office, Non-Final Office Action, U.S. Appl. No. 09/567,848, dated Feb. 24, 2004, 12 pages.
United States Patent and Trademark Office, Final Office Action, U.S. Appl. No. 09/567,848, dated Mar. 14, 2005, 5 pages.
United States Patent and Trademark Office, Advisory Action, U.S. Appl. No. 09/567,848, dated Jun. 7, 2005, 3 pages.
United States Patent and Trademark Office, Non-Final Office Action, U.S. Appl. No. 09/567,848, dated Apr. 18, 2007, 10 pages.
United States Patent and Trademark Office, Final Office Action, U.S. Appl. No. 09/567,848, dated Jan. 25, 2008, 6 pages.
United States Patent and Trademark Office, Notice of Allowance, U.S. Appl. No. 09/567,848, dated Aug. 1, 2008, 7 pages.
United States Patent and Trademark Office, Restriction Requirement, U.S. Appl. No. 10/870,729, dated Feb. 10, 2006, 3 pages.
United States Patent and Trademark Office, Non-Final Office Action, U.S. Appl. No. 10/870,729, dated Jan. 18, 2007, 13 pages.
United States Patent and Trademark Office, Miscellaneous Action, U.S. Appl. No. 10/870,729, dated Nov. 1, 2007, 3 pages.
United States Patent and Trademark Office, Final Office Action, U.S. Appl. No. 10/870,729, dated Mar. 17, 2008, 14 pages.
United States Patent and Trademark Office, Advisory Action, U.S. Appl. No. 10/870,729, dated Jun. 27, 2008, 3 pages.
United States Patent and Trademark Office, Non-Final Office Action, U.S. Appl. No. 10/870,729, dated May 27, 2009, 16 pages.
United States Patent and Trademark Office, Final Office Action, U.S. Appl. No. 10/870,729, dated Nov. 24, 2009, 5 pages.
United States Patent and Trademark Office, Notice of Allowance, U.S. Appl. No. 10/870,729, dated May 4, 2010, 5 pages.
United States Patent and Trademark Office, Non-Final Office Action, U.S. Appl. No. 12/075,261, dated Jul. 6, 2011, 15 pages.
United States Patent and Trademark Office, Non-Final Office Action, U.S. Appl. No. 12/075,261, dated Sep. 7, 2011, 7 pages.
United States Patent and Trademark Office, Final Office Action, U.S. Appl. No. 12/075,261, dated Sep. 20, 2012, 9 pages.

(56) References Cited

OTHER PUBLICATIONS

United States Patent and Trademark Office, Notice of Allowance, U.S. Appl. No. 12/075,261, dated Apr. 9, 2013, 11 pages.
United States Patent and Trademark Office, Final Office Action, U.S. Appl. No. 13/966,224, Final Office Action, dated Oct. 27, 2015, 6 pages.
United States Patent and Trademark Office, Non-Final Office Action, U.S. Appl. No. 13/966,224, dated Apr. 16, 2015, 10 pages.
United States Patent and Trademark Office, Notice of Allowance, U.S. Appl. No. 13/966,224, dated Jan. 20, 2016, 9 pages.

* cited by examiner

APPARATUS AND METHODS OF DELIVERING MUSIC AND INFORMATION

CLAIM FOR PRIORITY

This application is a continuation of U.S. patent application Ser. No. 13/966,224, filed Aug. 13, 2013, now U.S. Pat. No. 9,350,788, which is a continuation of U.S. patent application Ser. No. 12/075,261, filed Mar. 11, 2008, now U.S. Pat. No. 8,509,397, which is a continuation of U.S. patent application Ser. No. 09/567,848, filed May 9, 2000, now issued U.S. Pat. No. 7,444,353, which claims priority to U.S. Provisional Patent Application Ser. No. 60/179,256, filed Jan. 31, 2000, and U.S. Provisional Patent Application Ser. No. 60/182,309, filed on Feb. 9, 2000. The present application also incorporates by reference the entire disclosure of each of the foregoing applications.

BACKGROUND

Field of the Invention

This invention relates generally to a communication system and method, and specifically to methods and apparatuses for delivering music and information.

Description of the Related Art

People like to listen to music. Music plays an important role in people's lives, particularly in the lives of young people. There is a tremendous market to sell music and related products and services. Every day, people hear music that they like on radios, in cars, on the street, at friends' homes, at movie theaters, and at bars, restaurants and nightclubs. When people hear such music, they often do not know the name of the recording artist or the name of a particular piece of music.

Consumers may access music in a variety of ways, such as buying music at retail stores, requesting music to be broadcast by a radio station, and downloading music over the Internet.

Furthermore, people like their music to be portable.

SUMMARY OF THE INVENTION

The present invention recognizes a problem in the music industry in providing instant access to music and information related to music. The present invention recognizes that when people hear a piece of music that they like, they often have no means of buying the piece of music. Music producers, such as record companies, lose countless opportunities to sell such pieces of music. In any given week, an average person may hear several pieces of music that the person would like to buy and play back at a later time. If each person can buy every piece of music that the person wants after hearing it, record companies can dramatically increase their sales.

When people drive cars and hear a song that they like, they often have no way of finding out the name of the artist or the song. For example, people that commute an hour to work everyday may hear 20 songs a week that they would like to listen to again, either in the car or at home. They may be interested in listening to and buying the whole compact disc (CD). They may be interested in concert information, viewing the music video, buying a T-shirt or bumper sticker, etc. But if the radio announcer does not announce the name of the song and the name of the recording artist, the opportunity of the record company to sell that particular song and possibly the whole CD is lost.

The present invention relates to music and information delivery systems and methods. One system of the present invention allows a user to sample and buy a piece of music almost instantaneously, regardless of the location of the user and regardless of the time when the user hears the music. The system provides various music delivery options. For example, the system allows a user to download music to a laptop, a home computer, a discman, a Walkman, a home stereo system, a portable stereo system, and/or a vehicle stereo system. In addition, the system may download information related to the selected music (hereinafter "music-related information," described in further detail below), such as merchandise information, to such devices.

The system allows the user to download content (music and/or music-related information) to more than one device, including a device at a different geographical location from the user. For example, the user can request the transmission of content to a communication device in the possession of another user in another state or country. The music and information can advantageously be transmitted through wireless communication media, which is convenient for mobile users.

The system allows the user to download music that the user hears on the radio, even when the user does not know the title of the music or the artist that created the music. The system also allows the user to download music that is broadcast ambiently, for example at a party, store, theater, restaurant or bar. In one embodiment, a user can even sing, hum or whistle a few bars of a desired piece of music.

One aspect of the invention relates to a system for providing music. The system comprises a portable communication device configured to receive a piece of music from an audio source and transmit at least a portion of the piece of music via a first communication medium to a host computer. The host computer is configured to receive the piece of music from the portable communication device and search a database to identify and access the piece of music from the database. The host computer is configured to transmit the piece of music via a second communication medium to one or more reception units that are configured to receive the piece of music from the host computer via the second communication medium.

In one aspect, the present invention provides a system for providing music, the system comprising a portable communication device, a host computer, and one or more reception units. The portable communication device is configured to receive at least a portion of a piece of music from an audio source and transmit the portion of the piece of music via a first communication medium. The host computer is configured to receive the portion of the piece of music from the portable communication device and search a database to identify and access the piece of music from the database. The host computer is also configured to transmit the piece of music via a second communication medium. The reception units are configured to receive the piece of music from the host computer via the second communication medium.

In one embodiment, the host computer system is further configured to access and transmit information related to the piece of music via the second communication medium. Also, the reception units are further configured to receive the information related to the piece of music from the host computer.

In another aspect, the portable communication device is configured to receive a first audio signal from a transceiver and transmit the first audio signal via a first communication medium. The host computer is configured to receive the first audio signal from the portable communication device and search a database to identify and access a second audio signal from the database, the second audio signal being substantially similar to the first audio signal. The host computer is further configured to transmit the second audio signal via a second communication medium. The reception units are configured to receive the second audio signal from the host computer via the second communication medium.

In another aspect, the portable communication device is configured to receive and identify a piece of music from an audio source and transmit an identification code associated with the piece of music via a first communication medium. The host computer is configured to receive the identification code from the portable communication device and access the piece of music from a storage medium.

In another aspect, the present invention provides a portable communication device comprising a user interface and a transceiver. The user interface is configured to receive and process commands from a user. The user interface comprises a microphone configured to receive a sequence of sounds from an audio source upon a start command from the user received by the user interface. The transceiver is configured to transmit the sequence of sounds to a remote computer, wherein the remote computer is configured to access the sequence of sounds from a storage medium and transmit the sequence of sounds to one or more reception units.

Another aspect of the invention relates to a portable audio playback unit comprising a transceiver and an audio output. The transceiver is configured to receive one or more pieces of music from a computer via a wireless communication medium. The pieces of music are identified by the computer and received from a portable communication device. The audio output is configured to output the one or more pieces of music.

Another aspect of the invention relates to a computer server comprising a transceiver and a matching module. The transceiver is configured to receive a first sequence of sounds from a portable communication device. The matching module is configured to identify a second sequence of sounds that is substantially similar to the first sequence of sounds. The matching module is configured to access the second sequence of sounds from a database. The transceiver transmits the second sequence of sounds to a reception unit.

In another aspect, the present invention provides a method of delivering music, the method comprising: receiving a sampled piece of music from a portable communication device via a first communication medium; comparing the sampled piece of music with a plurality of pieces of music stored in a storage medium at a server computer; identifying one or more pieces of music from the plurality of pieces of music in the storage medium, that are substantially similar to the sampled piece of music; and transmitting the one or more substantially similar pieces of music to a user-designated reception unit via a second communication medium.

In another aspect, the present invention provides a method for receiving music, comprising: receiving an ambient broadcast of a piece of music from an audio source; obtaining an identification code of the piece of music from the broadcast; transmitting the identification code across a first communication channel to a host computer configured to access the piece of music in a database; and transmitting the piece of music from the host computer across at least one of the first communication channel and a second communication channel to one or more reception units.

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION

The present invention relates to music and information delivery systems and methods. One system of the present invention allows a user to sample and buy a piece of music almost instantaneously, regardless of the location of the user and regardless of the time when the user hears the music. The system provides various music delivery options. For example, the system allows a user to download music to a portable wireless phone, an organizer, a laptop, a home computer, a discman, a Walkman, a home stereo system, a portable stereo system, and/or a vehicle stereo system. In addition, the system may download information related to the selected music, such as merchandise information, to such devices.

The system allows the user to download content (music and/or music-related information) to more than one device, including a device at a different geographical location from the user. For example, the user can request the transmission of content to a communication device in the possession of another user in another state or country. The system allows the user to download music that the user hears on the radio, even when the user does not know the title of the music or the artist that created the music. The system also allows the user to download music that is broadcast ambiently, for example at a party, store, theater, restaurant or bar.

Various embodiments of the invention utilize (1) the Internet, (2) wireless communication technology, (3) embedded audio signal technology, (4) music data compression and transfer technology, (5) voice-activated command technology and/or (6) audio signal identification technology. Exemplifying Internet and web technology are described in a publication entitled "WEB Techniques" published by Miller Freeman, such as Volume 5, Issue 2, dated February, 2000. Exemplifying wireless communication systems are described in a text book entitled "Mobile Communications Engineering" by William C. Y. Lee, published by McGraw-Hill, copyright 1998, ISBN 0-07-037103-2. Exemplifying telecommunication systems are described in a text book entitled "Desktop Encyclopedia of Telecommunications" by Nathan J. Muller, published by McGraw-Hill, copyright 1998, ISBN 0-07-044457-9. Exemplifying embedded audio signal technology is described in U.S. Pat. No. 5,581,576 entitled "Radio Information Broadcasting and Receiving System." Exemplifying music data compression and transfer technology is described in U.S. Pat. No. 5,734,119 entitled "Method For Streaming Transmission of Compressed Music." Exemplifying voice-activated command technology is described in U.S. Pat. No. 5,703,308 entitled "Karaoke Apparatus Responsive to Oral Request of Entry Songs." Exemplifying audio signal identification technology is described in U.S. Pat. No. 5,581,658 entitled "Adaptive System For Broadcast Program Identification And Reporting."

Overall System Structure

Figure 1:
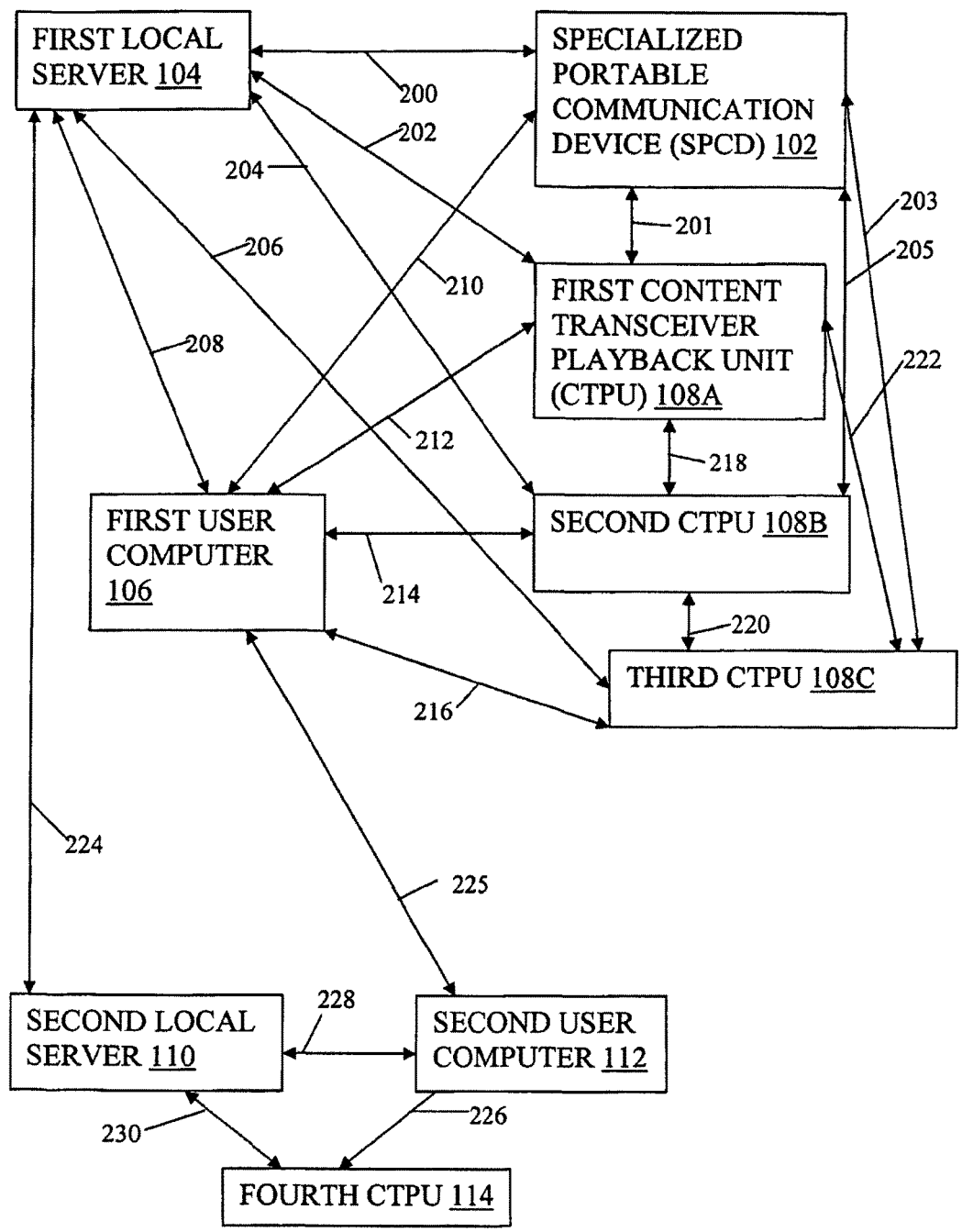
FIG. 1 illustrates one embodiment of a music and information delivery system according to the teachings of the present invention.

FIG. 1 illustrates one embodiment of a music and information delivery system 100 according to the teachings of the present invention. In FIG. 1, the system 100 comprises a plurality of communication devices, which may include, for example, a specialized portable communication device ("SPCD") 102, a first local server 104, a first user computer 106, and one or more content transceiver/playback units ("CTPUs"), such as a first CTPU 108A, a second CTPU 108B, and a third CTPU 108C, as illustrated. Although only one server, one SPCD, one user computer, and three CTPUs are shown, those of skill in the art will understand that any number of such communication devices may be included within the music and information delivery system 100 of the invention.

In FIG. 1, the SPCD 102, local server 104, user computer 106 and CTPUs 108A-108C communicate with each other via communication mediums 200-230. Each communication medium 200-230 may comprise one or more forms of communication. For example, each communication medium 200-230 may comprise a public telephone switching network (PSTN), an ISDN line, a cable system, a broadband system, an Internet system, a wireless communication system, a fiber channel, a fiber optic cable network, etc., or some combination thereof. Some of these communication systems may overlap in various implementations of the present invention. The present invention may be implemented with other forms of communication not listed here. The present invention is not restricted to one or more particular forms of communication.

A wireless communication system used in embodiments of the present invention may comprise an FM broadcast, an AM broadcast, a microwave link, a television broadcast using television channel bandwidth to transmit a compressed audio signal (e.g., using JPEG, MPEG or other standards), a cellular system, a digital cellular system, a personal communication services (PCS) system, a satellite communication system, a packet radio system, or a mobile broadband system, among others. A cellular system may use code division multiple access (CDMA, e.g., IS-95), time division multiple access (TDMA, e.g., IS-136, personal digital phone (PDC), Global System Mobile (GSM)), or frequency division multiple access (FDMA), among others.

Figure 6:
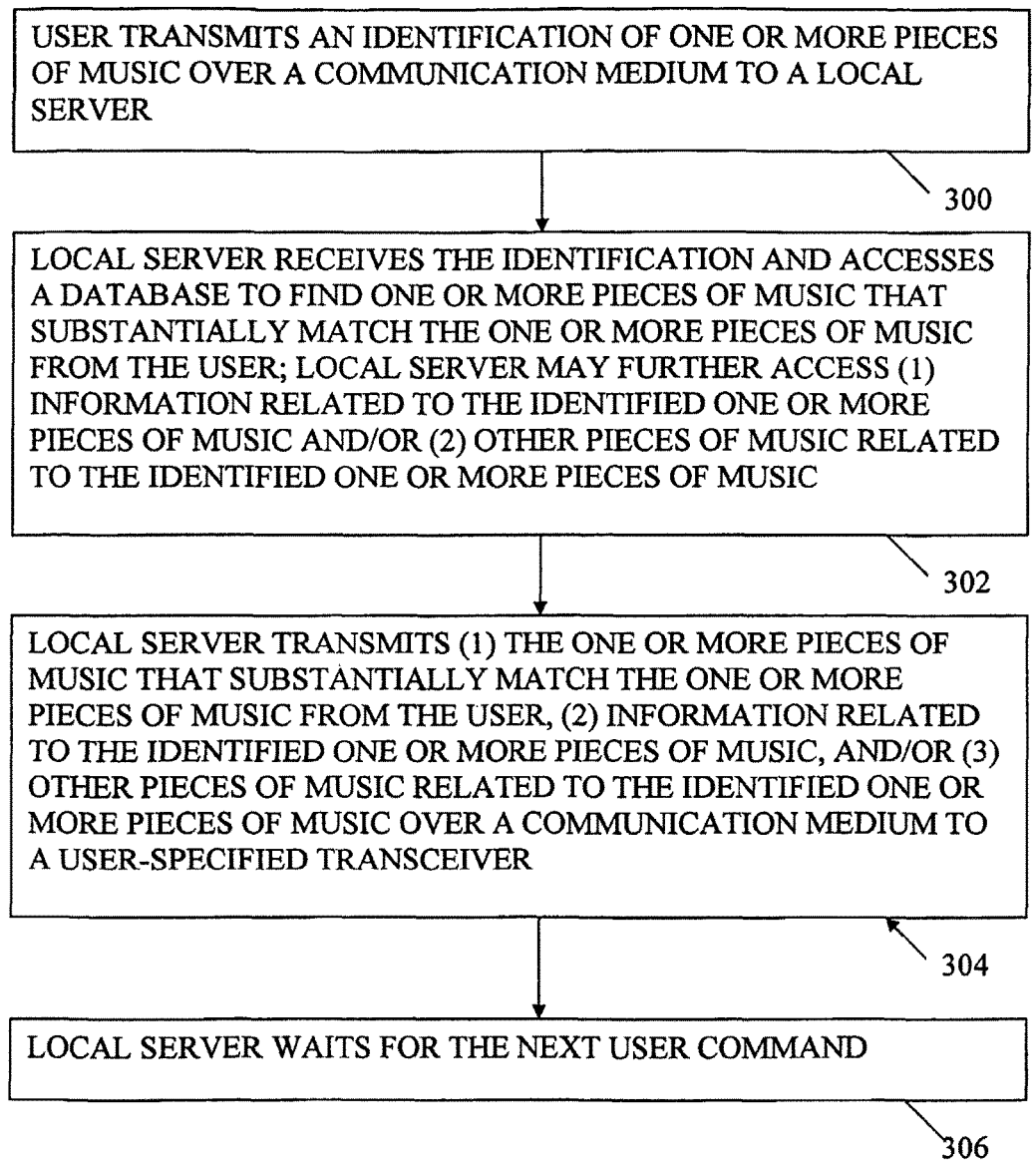
FIG. 6 illustrates one embodiment of a method of sampling, identifying and transmitting one or more pieces of music and/or information related to the one or more pieces of music.

FIG. 6 illustrates one embodiment of a method of sampling, identifying and transmitting one or more pieces of music and/or information related to the one or more pieces of music using the system of FIG. 1. In a start block 300, the SPCD 102, the user computer 106 or the CTPU 108 receives a command from a user and transfers the command to the local server 104 via a communication medium or network 200, 202, 204, 206 or 208. For example, the user command may include an identification or sample of one or more pieces of music. In one embodiment, the SPCD 102 or the CTPU 108 may first transfer the user's command to the user computer 106, and then the user computer 106 transfers the command to the local server 104.

As used herein, an "identification" refers to a code identifying a piece of music, or to at least a segment of a piece of music. As used herein, a "sample" refers to at least a segment of a piece of music. A "piece of music" may comprise, for example, a song, a portion of a song, an instrumental score, etc.

In a block 302, the local server 104 receives the identification from the user and accesses the identified one or more pieces of music, other pieces of music related to the piece of music identified by the user, and/or information related to the identified piece(s) of music from a database. In a block 304, the local server 304 transfers the identified content (music, related music and/or music-related information) over a communication network 200, 202, 204, 206 or 208 to the SPCD 102, CTPU 108 and/or user computer 106, as requested by the user. Each device in FIG. 1 is described in further detail below.

Figure 4:
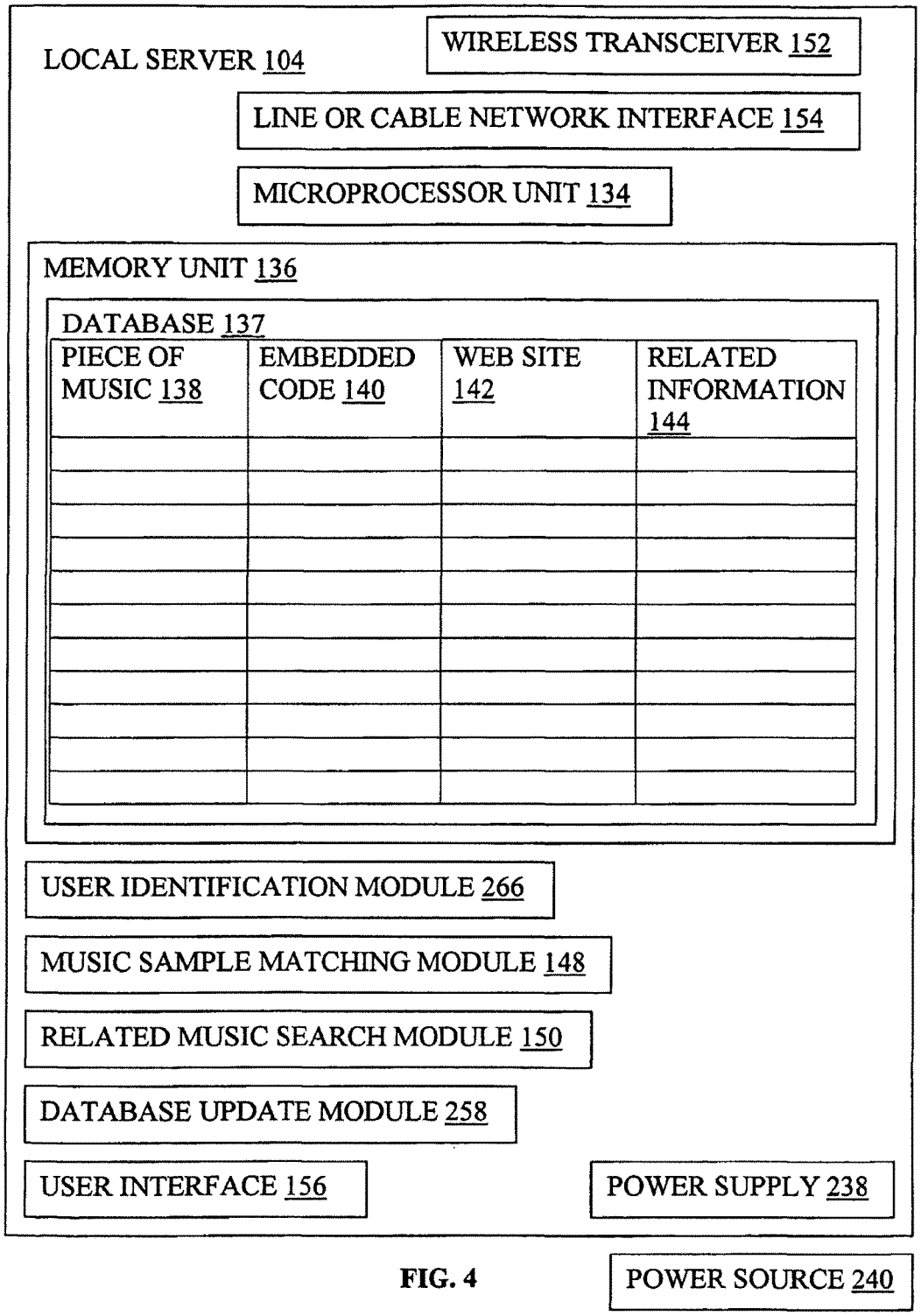
FIG. 4 illustrates one embodiment of a local system server of FIG. 1.

In one embodiment, the SPCD 102 (FIG. 1) is configured to sample and send ambient music to the first local server 104, which matches the sample to a piece of music in a database 137 (FIG. 4). The first local server 104 can then transmit the matched piece of music to a user-specified device, as described further below. The CTPUs 108A-C are configured to receive, store, and/or play transmissions of pieces of music. The first user computer 106 and the CTPUs 108A-C are configured to play the music themselves or transfer the music to an external audio device, such as a stereo system.

The Specialized Portable Communication Devices (SPCD)

Figure 2:
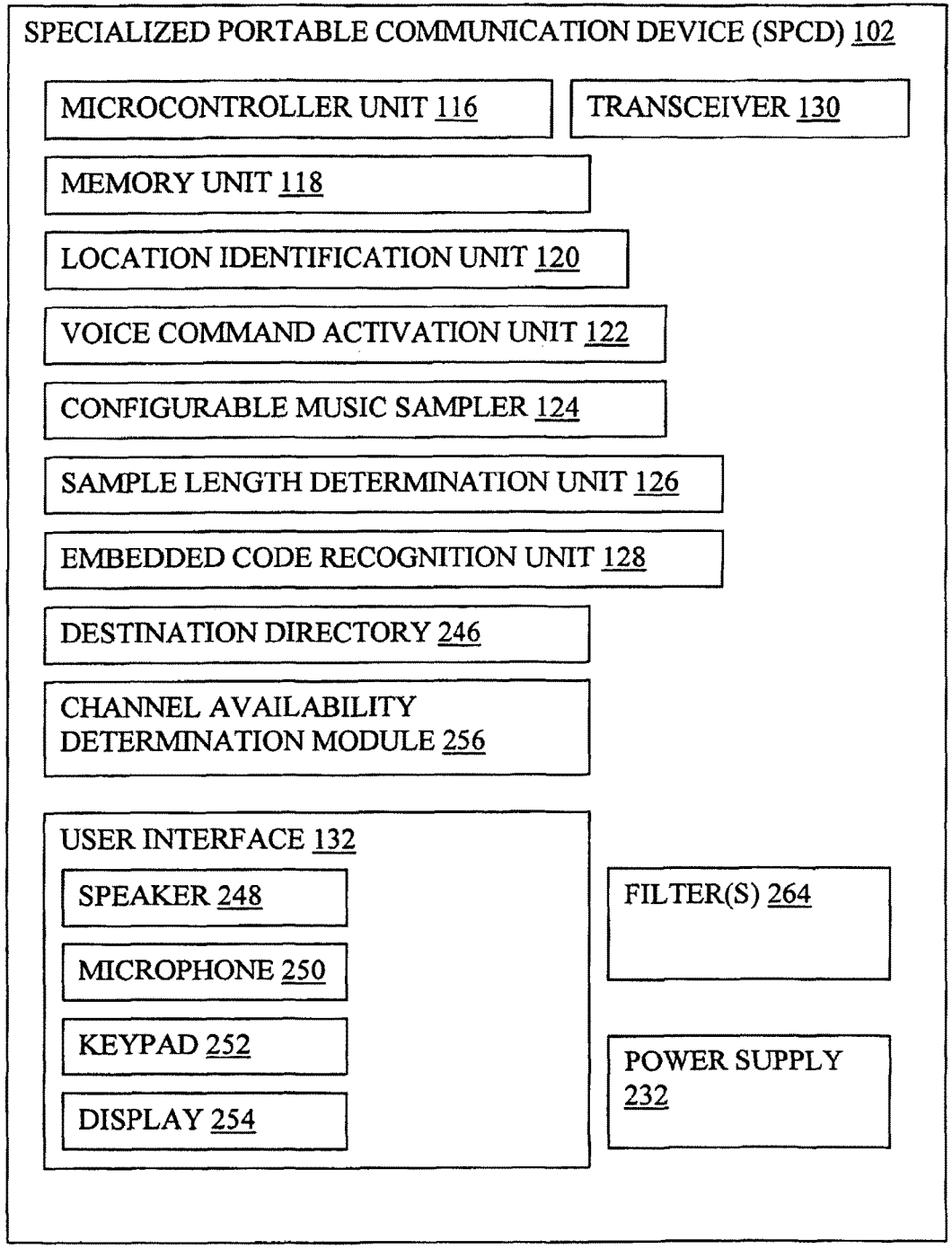
FIG. 2 illustrates one embodiment of a specialized portable communication device (SPCD) of FIG. 1.

FIG. 2 illustrates one embodiment of an SPCD of the present invention, such as the SPCD 102 shown in FIG. 1. The SPCD 102 is preferably a portable, handheld device that a user can conveniently carry on his or her body. In one embodiment, the SPCD 102 is a modified wireless phone, such as the wireless phones manufactured by Nokia Corporation in Finland, Ericsson Telephone Co. in Stockholm, Sweden or Motorola, Inc. in Schaumburg, Ill. In another embodiment, the SPCD 102 is a modified laptop or personal organizer, such as a Palm Pilot manufactured by Palm, Inc. in California.

The SPCD 102 may comprise one of several different combinations of various components. In the embodiment shown in FIG. 2, the SPCD 102 comprises a microcontroller unit 116, a wireless transceiver 130, a memory unit 118, a location identification unit 120, a voice command activation unit 122, a configurable music sampler 124, a music sample length determination unit 126, an embedded code recognition unit 128, a destination directory 246, a channel availability determination module 256, a power supply 232, a user interface 132 and filter(s) 264.

Some of the components and modules illustrated in FIG. 2 may be integrated or overlapped. The location identification unit 120, voice command activation unit 122, configurable music sampler 124, music sample length determination unit 126, embedded code recognition unit 128, destination directory 246, and channel availability determination module 256 may each comprise software, hardware or a combination of software and hardware. In other embodiments, the SPCD 102 may comprise other hardware components and software modules instead of or in addition to the components and modules shown in FIG. 2. In other embodiments, the SPCD 102 comprises less than all of the components shown in FIG. 2.

The words "unit," "module," and "component," as used herein, may comprise software, hardware or a combination of software and hardware.

In FIG. 2, the microcontroller unit 116 may comprise one or more microprocessors and/or controllers. In one embodiment, the microcontroller unit 116 is a Pentium Processor, manufactured by Intel in Santa Clara, Calif. The microcontroller 116 is configured to process data and commands stored in the memory unit 118 and control the operation of the transceiver 130, user interface 132, location identification unit 120, voice command activation unit 122, configurable music sampler 124, music sample length determination unit 126, embedded code recognition unit 128, destination directory 246, and channel availability determination module 256.

In FIG. 2, the filter(s) 264 comprises one or more filters for filtering audio signals. For example, the filter(s) 264 may comprise one or more bandpass filters, low pass filters, high pass filters, anti-aliasing filters, etc.

In one embodiment, the user interface 132 of FIG. 2 comprises a speaker 248, a microphone 250, a keypad 252 and a display 254. The speaker 248 is preferably configured to have at least two volume modes: a first volume mode that allows a user to hold the SPCD 102 next to the user's ear, much like a standard wireless phone; and a second volume mode that projects audio signals loud enough such that a user can hear the audio signals at least two feet away from the SPCD 102. In the second volume mode, the user can advantageously interact with the SPCD 102 without holding the SPCD next to the user's ear. Thus, the second volume mode allows a user to simultaneously perform others tasks, such as drive a car. In one embodiment, the speaker 248 has a range of volume modes. The user may adjust the volume mode by pressing one or more keys on the keypad 252, or by issuing a voice command such as the words "LOUDER" OR "SOFTER."

In FIG. 2, the microphone 250 is preferably configured to receive voice commands from the user. The sensitivity of the microphone 250 is preferably high enough to detect user voice commands. Thus, the user can advantageously interact with the SPCD 102 without holding the SPCD 102 next to the user's mouth. The microphone 250 is also preferably configured to sample pieces of music at least one foot away from the SPCD 102. In one embodiment, the microphone 250 is configured to detect sample pieces of music at least 20 feet away.

In one embodiment, the microphone 250 is configured to increase its sensitivity level when a user says "SAMPLE" or presses a key on the keypad 252 to sample a piece of music. The increased sensitivity level may cause the microphone 250, the filter(s) 264 and/or other components of the SPCD 102 to search for audio signals that resemble music, such as whistling, humming, singing, drum beats, other musical instruments, etc., and filter out ambient noise, such as people talking, traffic sounds, etc. The increased sensitivity level may also cause the microphone 250 and/or other components of the SPCD 102 to suppress background sounds (extraneous noise). One method and apparatus of suppressing background sounds is described in U.S. Pat. No. 5,848,163, which is hereby incorporated herein by reference in its entirety.

In FIG. 2, the keypad 252 may comprise a number of embodiments. In one embodiment, the keypad 252 comprises a standard numeric keypad found in existing wireless phones plus one or more function keys to operate the features of the SPCD 102 described herein. For example, the keypad 252 may comprise a function key that causes the microphone 250 to begin receiving a sample piece of music and the transceiver 130 to begin transmitting the sample piece to the server 104 (FIG. 1).

In FIG. 2, the display 254 may comprise a number of embodiments. In one embodiment, the display 254 comprises a standard liquid crystal display (LCD) found in existing wireless phones. In another embodiment, the display 254 comprises an LCD with a background illumination. In another embodiment, the display 254 comprises a projector configured to project a graphical user interface (GUI) display onto a surface, such as, for example, a wall, a sidewalk or a door.

In FIG. 2, the power supply 232 may comprise a battery, such as, for example, a lithium ion battery, or an adapter coupled to an electrical power outlet. In one embodiment, the power supply 232 is rechargeable.

In FIG. 2, the memory unit 118 comprises a nonvolatile memory, such as, for example, a semiconductor chip or a hard disk drive. The memory unit 118 may further comprise a random access memory, a buffer memory, and/or a back-up memory. The memory unit 118 is preferably configured to store, for example, (i) firmware and data to operate the SPCD modules and units 120-128, 246, 256 described herein, (ii) partial or complete pieces of music, (iii) "music selection information," i.e., information from which a user can select content to be transferred from a local server 104, and (iv) a history of prior content requests by the user. In one embodiment, the memory unit 118 stores a number of previously requested songs, song titles, album titles, artist information, etc.

In FIG. 2, the transceiver 130 is configured to send and receive information via the forms of communication discussed above with reference to FIG. 1. In one embodiment, the transceiver 130 is configured to send and receive information such as partial or complete pieces of music, requests for pieces of music or related information, content delivery instructions, and other information.

In general, the SPCD 102 is configured to (i) sample a piece of music that is broadcast ambiently or directly to a transceiver 130 and (ii) transmit a content request to the local server 104. In one embodiment, the SPCD 102 also downloads audio and/or visual information (e.g., text, graphics, animation, etc.) from the first local server 104 that allows a user to select pieces of music, albums, and related products and services.

The Location Identification Unit

In FIG. 2, the ,location identification unit 120 is configured to determine the location of the SPCD 102. In one embodiment, the location identification unit 120 is merely configured to determine the location of the SPCD 102 in relation to the local server 104, the user computer 106 and/or the CTPU 108. For example, the location identification unit 120 may simply send a test signal to the local server 104, the user computer 106 and/or the CTPU 108 and measure the response time of a response signal to determine the distance of the server 104, user computer 106 and/or the CTPU 108 from the SPCD 102. As described above, the SPCD 102 may transmit a user command to a CTPU 108 or user computer 106, which then transmits the data to the server 104.

In another embodiment, the location identification unit 120 includes a global positioning system (GPS) unit configured to operate in combination with a satellite system for monitoring the position of the SPCD 102. Alternatively, other types of position monitoring methods may be used without departing from the scope of the invention.

The location information of the SPCD 102 can be used, for example, to determine the nearest server 104, CTPU 108, user computer 106 (FIG. 1) and/or network node to receive a transmission. Thus, the location identification unit 120 may reduce the processing time associated with processing a user's request to the server 104.

In one embodiment, the location identification unit 120 determines the nearest music store and informs the user of the location of the music store and/or whether the sampled piece of music is currently on sale at that store. In another embodiment, the location identification unit 120 provides a list of music stores to the user via the display 254.

Channel Availability Determination Module

In FIG. 2, the channel availability determination module 256 determines the availability and/or available bandwidth of the communication mediums 200, 210, 201, 203, and 205 (FIG. 1). In one embodiment, the channel availability determination module 256 analyzes one or more response signals from the server 104, CTPU 108 and/or user computer 106, and determines the availability and/or available bandwidth of various communication channels within each of the communication mediums 200, 210, 201, 203, and 205 based on the response signals. Those skilled in the art will readily appreciate from the teachings herein that each of the mediums 200, 210, 201, 203, and 205 includes many different communication channels.

In one embodiment, the channel availability determination module 256 also determines the signal-to-noise ratio (SNR) of one or more of the communication channels 200, 210, 201. Thus, the channel availability determination module 256 selects an available communication channel with the least amount of noise to transmit data from the transceiver 130. As described above, the SPCD 102 may transmit data to a CTPU 108 or user computer 106, which then transmits the data to the server 104.

The Voice Command Activation Unit

In FIG. 2, the voice command activation unit 122 receives voice audio signals from the microphone 250 and converts the voice audio signals into commands recognized by the microcontroller unit 116 and/or the modules 120, 122, 124, 126, 128, 246, 256.

Such commands may include, for example, commands to (i) transmit samples of music via the transceiver 130, (ii) store samples of music in the memory unit 118, (iii) download music selection information from a local server 104, (iv) transmit a content request to a local server 104, (v) read an embedded code within a piece of music, (vi) specify a destination for the server 104 to download the requested content, and/or (vii) find the nearest music store that has the sampled piece of music in inventory. Those skilled in the art will readily appreciate from the teachings herein that the voice command activation unit 122 can be configured to receive various other commands as well, as may be desirable for implementing the system described herein.

Voice command activation is particularly convenient when the user is driving a vehicle or engaged in some other activity where the user may not be able to hold or operate the SPCD 102. Those skilled in the art will understand that various voice recognition systems and technologies will be suitable for the purposes of the present invention.

Configurable Music Sampler

In FIG. 2, the configurable music sampler 124 samples a piece of music received by the microphone 250 for a configurable length of time. In one embodiment, the length of time is configured to be 5 seconds. In another embodiment, the length of time is configured to be 10 seconds. The length of time may be configured to be any length that is sufficient for the server 104 to properly identify a sampled piece of music with a particular degree of certainty, e.g., a 60%, 70%, 80%, 90% or 95% chance of correct identification. The length of time may be configured by the user, the server 104, an operator of the server 104, or an SPCD manufacturer.

In one embodiment, the configurable music sampler 124 informs the user that the length of sample time has expired by causing the user interface 132 to emit a sound from the speaker 248 or display a message on the display 254.

Sample Length Determination Unit

In FIG. 2, the sample length determination unit 126 of the SPCD 102 is preferably configured to determine the minimal length of time that is sufficient for the server 104 to identify a piece of music sampled by the microphone 250. The length of time may vary from music sample to music sample, depending on the type of music, the starting point of the sample, the method of identifying the sampled music, etc. In one embodiment, the sample length determination unit 126 determines the minimal length of a sample by analyzing distinctive sounds in the sample, such as, for example, drum beats, vocals, guitar rifts, keyboard, etc.

The degree of certainty, e.g., 60%, 70%, 80%, 90%, 95%, for correct identification may be configured by the user, the SPCD manufacturer, the server 104 or an operator at the server 104. Thus, the configurable music sampler 124 has a pre-configured length of sample time, and the sample length determination unit 126 has a pre-configured degree of certainty for correct music identification.

The sample length determination unit 126 may operate in addition to or instead of the configurable music sampler 124. For example, in one embodiment, if the configurable music sampler 124 is configured to sample a piece of music for 10 seconds, and the sample length determination unit 126 determines that 5 seconds of a particular sample is sufficient for the server 104 to identify the piece of music, then the sample length determination unit 126 may override the 10-second time period of the configurable music sampler 124. In another embodiment, the user or the SPCD manufacturer may activate either the configurable music sampler 124 (with a pre-configured length of sample time) or the sample length determination unit 126 (with a pre-configured degree of certainty for correct music identification and a variable length of sample time).

There are at least two methods of identifying a piece of music, as described in further detail below with reference to the server 104. One method involves matching the sampled piece of music to a piece of music stored in a database 137 of the local server 104. Another method involves reading one or more embedded signals in the sampled piece of music to identify the sampled piece of music.

The Embedded Code Recognition Unit

The embedded code recognition unit 128 is configured to read, or at least recognize the presence of, a music identification code embedded within a piece of music played ambiently or received from a radio broadcast. In one embodiment, the embedded code comprises audio signals transmitted within a subcarrier along with the music itself.

The embedded audio signals may comprise a repeating signal of finite length that repeats, e.g., every four seconds, a series of repeating signals or a continuous signal. In one embodiment, the embedded audio signal code has a start signal and an end signal. In one embodiment, the signals are embedded in a drumbeat of the piece of music. In one embodiment, the embedded code is embedded by a radio station before or during a radio broadcast. In another embodiment, the embedded code is embedded by a recording company as the music is stored on a medium such as a compact disc. In one embodiment, the embedded code comprises audio signals at a frequency that is preferably inaudible to humans and safe for the environment, e.g., not harmful to cats, dogs and other animals. Those skilled in the art will readily appreciate from the teachings herein that any of a variety of methods for embedding codes will be suitable for the purposes of the present invention, and also that any of a variety of different types of codes can be used.

In one embodiment, the SPCD 102 transmits one or more music identification codes read by the embedded code recognition unit 128 to the local server 104. The local server 104 scans a database 137 to find the corresponding songs, as described below with reference to FIG. 4.

In one embodiment, the embedded code recognition unit 128 itself is configured to identify the name of the artist, the title of the song and/or the title of the album without communicating with the server 104. In one embodiment, the user can say "IDENTIFY" into the microphone to instruct the embedded code recognition unit 128 to identify the title of the piece of music, the name of artist, and/or the title of the album(s) that include(s) the song. The embedded code recognition unit 128 identifies the name of the artist, the title of the song and/or the title of the album and presents this information to the user via the display 254 or the speaker 248.

Destination Directory Module

The destination directory module 246 matches one or more spoken words, such as, for example, "HOUSE," "CAR," "ANNE," "JESSICA'S CAR," "ALL FRIENDS," "SELECTED FRIENDS," "FAMILY," "IMMEDIATE FAMILY," "SISTER," "BOSS," or "BUSINESS ASSOCIATES," to one or more device identification codes. Each user computer 106, 112 and CTPU 108A-C, 114 in the system 100 (FIG. 1) is assigned a unique device identification code. When the user sends a content request to the first local server 104, the user can also specify a destination for the content by issuing a voice-activated command.

In one embodiment, the device identification codes comprise phone numbers stored in the memory 118. In one embodiment, the destination directory module 246 uses, among other things, a list of names and corresponding phone numbers stored in the memory 118, similar to phone number lists currently stored on cellular phones manufactured by Nokia. The list of names and corresponding phone numbers stored in the memory may be modified by the user by adding, deleting or changing entries.

In one embodiment, the destination directory 246 allows the user to categorize the identification codes into groups such as "FRIENDS," "FAMILY" or "BUSINESS ASSOCIATES." In another embodiment, the destination directory 246 automatically categorizes some or all of the identification codes into groups.

If the destination directory module 246 does not find a match in the stored list, then the SPCD 102 can generate an error signal via the display 254 or the speaker 248 to the user or send the spoken word to the server 104 for processing at the server 104.

When the SPCD 102 finds the one or more corresponding device identification codes, the SPCD 102 transmits the one or more device identification codes to the local server 104. In another embodiment, the SPCD 102 transfers the identified destinations to the local server 104, and the local server 104 searches for the one or more device identification codes corresponding to the identified destinations. The local server 104 is configured to transmit the user-requested content to the devices with the corresponding device identification codes. For example, a user can request that selected content be delivered to a CTPU integrated within the user's car stereo and/or the user's user computer.

Figure 7:
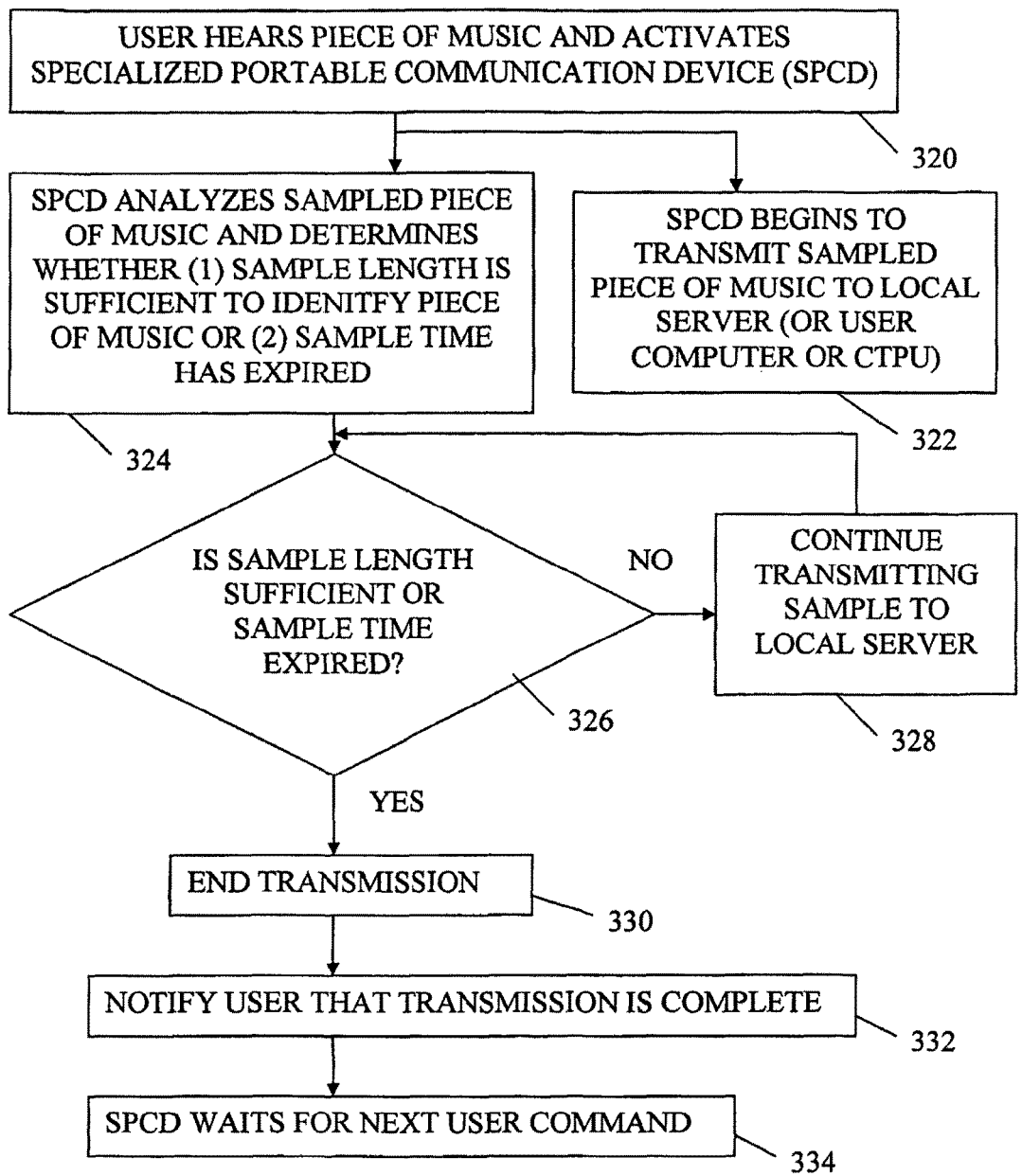
FIG. 7 illustrates one embodiment of a method of sampling one or more pieces of music.

Operation of the SPCD and FIG. 7

FIG. 7 illustrates one embodiment of a method of sampling one or more pieces of music in accordance with one aspect of the invention. In a start block 320, the user hears a piece of music and activates the SPCD 102 by, for example, pressing a key on the keypad 252 and/or saying a command such as, "SAMPLE." The user may not know the title or artist of the piece of music. In a block 322, the configurable music sampler 124 reacts to the user command and causes the microphone 250 of the SPCD 102 to receive the audio signals of the piece of music and transfer the signals to the transceiver 130. In one embodiment, the SPCD 102 records the sampled piece of music in the memory unit 118 in addition to or instead of transferring the signals to the transceiver 130.

In the block 322, the transceiver 130 transmits the sampled piece of music to a local server such as the first local server 104 (FIG. 1). In one embodiment, the SPCD 102 'dials' a communication code, such as a phone number, pre-stored in the memory unit 118, the communication code being associated with the server 104. The server 104 accepts the call, and the transceiver 130 transmits the sampled piece of music to the server 104. In another embodiment, the SPCD 102 'dials' a pre-stored phone number that is associated with a CTPU 108 or user computer 106 and transmits the sampled piece of music to the CTPU 108 or user computer 106. The CTPU 108 or user computer 106 then transmits the sampled piece of music to the server 104.

In one embodiment, the CTPU 108 or user computer 106 is configured to perform the operations of the server 104, as described below. In other words, the CTPU 108 or user computer 106 has the software and/or hardware to process user commands, such as identifying a sampled piece of music and sending music, related music or information to a user-specified destination. In this embodiment, the SPCD 102 may simply send the user command and sampled piece of music to the CTPU 108 or user computer 106.

In blocks 324 and 326, the configurable music sampler 124 and/or the sample length determination unit 126 analyzes the music sample to determine whether the sample length is sufficient to identify the piece of music with a particular degree of certainty (e.g., at least 60%, 70%, 80%, 90%, or 95% degree of certainty) and/or whether the sample time period, e.g. 10 seconds, has expired. If the sample length is not sufficient, then the SPCD 102 continues to transmit the sample to the server 104 in a block 328.

If the sample length is sufficient, then the transceiver 130 ends the transmission of the sampled piece of the music (block 330). In a block 332, the SPCD 102 notifies the user that the transmission is complete by displaying a message on the display 254 and/or emitting an audio signal from the speaker 248. In a block 334, the SPCD 102 waits for the next user command.

In response to the sampled music transmission from the SPCD 102, the server 104 preferably scans a storage medium located within the server 104 or in another local or remote device to identify the piece of music. The server can then transmit the entire piece of music, related pieces of music and/or music-related information to one or more communication devices specified by the user. The operation of the server 104 is described further below with reference to FIGS. 4 and 8.

In one embodiment, the SPCD 102 is configured to store a plurality of samples and transmit all of them substantially at the same time. The SPCD 102 can store preferably up to 10, more preferably up to 20, more preferably up to 50, and even more preferably up to 100 samples of music or other types of audio signals. In one embodiment, the SPCD 102 stores up to 5-10 samples and then send the samples all at once to the server 104 after the 5th or 10th sample is taken. In one embodiment, the SPCD 102 can store any number of samples within a limited memory allocation. Once the samples consume the entire memory allocation, the SPCD 102 transmits the samples all at substantially the same time to the server 102, user computer 104, or CTPU 108.

Some User Commands

In FIG. 2, the SPCD 102 may be configured to recognize several voice commands from a user, such as, for example:
"SAMPLE"
"SEND SONG TO MY CAR" (if the user has two or more cars, then the user can specify which car, e.g., "SEND SONG TO MY JEEP")
"SEND ENTIRE CD TO MY CAR"
"SEND RELATED MUSIC (BY ARTIST or GENRE, etc.) TO MY CAR"
"SEND INFO TO MY CAR"
"SEND SONG (and/or CD, RELATED MUSIC, INFO, LYRICS, CONCERT INFO, MERCHANDISE INFO, etc.) TO MY HOME (and/or CAR)"
"SEND SONG (and/or CD, RELATED MUSIC, INFO, etc.) TO JESSICA'S CAR (and/or HOME, etc.)"
"SEND SONG TO MY FRIENDS (and/or MY FAMILY, MY SISTER, etc.)"
"ADD SONG TO MY DANCE MIX AT HOME (and/or CAR, etc.)"
"ADD SONG TO MY ROMANTIC DINNER LIST AT HOME (and/or CAR, etc.)"
"MOVIE: 'The Matrix'" (order the actual movie or soundtrack)
"CANCEL ORDER"

For most of the commands above, the SPCD 102 transmits the command to the server 104 (or CTPU 108 or user computer 106) which processes the command and transmits the requested content to the user-designated device, such as a user computer 106 or 112 or a CTPU 108A-C, 114. The user may use one or more of the above commands in combination.

For example, when the user designates a "CAR," the server 104 may transmit the requested content to a CTPU 108 located in a car. When the user designates a "HOME," the server 104 may transmit the requested content to a CTPU 108 or user computer 106 located in a house or apartment. If the user does not specify a device, the server 104 may send the requested content to a default device, such as the user computer 106 or the CTPU 108A.

In one embodiment, when the user specifies "MY DANCE MIX" or "MY ROMANTIC DINNER LIST," the server 104 (or the user computer 106) adds the requested music to a compilation stored at the user-designated device, such as the user computer 106 or the CTPU 108A.

In one embodiment, when the user says "LYRICS" and samples a piece of music, the local server 104 identifies the piece of music and downloads the lyrics of the piece of music, if available, to a user-designated device, such as the user computer 106 or the CTPU 108A.

In one embodiment, when the user says "MOVIE: 'The Matrix'," the local server 104 downloads a movie soundtrack from the movie "The Matrix" to a user-designated device, such as the user computer 106 or the CTPU 108A.

In one embodiment, when the user says "CANCEL ORDER," the server 104 cancels the current or latest user command.

In one embodiment, the SPCD 102 allows the user to order one or more songs for playback at the user computer site or CTPU site by specifying: (1) the name(s) of songs and/or artists, (2) the type(s) of music, (3) the order of the songs, (4) the desired length of compilation, (5) the start time and end time, and/or (6) whether the songs will repeat.

The Server

FIG. 4 illustrates one embodiment of a server of the music and information delivery system, such as the first local server 104 shown in FIG. 1. In FIG. 4, the local server 104 may comprise any of several different combinations of various components, including a microprocessor unit 134, a wireless transceiver 152, a line or cable network interface 154, a memory unit 136, a music sample matching module 148, a related music search module 150, a database update module 258, a user identification module 266, a power supply 238 and a user interface 156.

Some of the components and modules illustrated in FIG. 4 may be integrated or overlapped. The user identification module 266, sample matching module 148, related music search module 150 and database update module 258 may each comprise software, hardware or a combination of software and hardware. In other embodiments, the server 104 may comprise other hardware components and software modules instead of or in addition to the components and modules shown in FIG. 4. For example, the server 104 may further comprise one or more memory buffers, analog-to-digital converters, digital-to-analog converters, cyclic redundancy code (CRC) units, error correction code (ECC) units, error detection code (EDC) units, modulators, demodulators, etc. In other embodiments, the server 104 comprises less than all of the components shown in FIG. 4.

In FIG. 4, the microprocessor unit 134 may comprise a number of microprocessors or microcontrollers. In one embodiment, the microprocessor unit 134 comprises a Pentium Processor, manufactured by Intel in Santa Clara, Calif. The microprocessor unit 134 may perform a variety of functions. In one embodiment, the microprocessor unit 134 is configured to process data and commands stored in the memory unit 136 and control the operation of the wireless transceiver 152, the line/cable network interface 154, the user interface 156, the user identification module 266, the sample matching module 148, the related music search module 150 and the database update module 258.

In FIG. 4, the memory unit 136 comprises a nonvolatile memory, such as, for example, one or more semiconductor chips, hard disk drives, optical disk drives, an array of disks, etc. The memory unit 136 may further comprise a random access memory, a buffer memory, and/or a back-up memory.

In FIG. 4, the memory 136 preferably stores firmware to run the music sample matching module 148, related music search module 150, database update module 258 and user identification module 266.

In FIG. 4, the memory unit 136 further comprises a database 137 with a plurality of data fields, such as, for example, (i) pieces of music 138, (ii) music identification codes 140 that correspond to the pieces of music 138, (iii)

web site URLs 142 relating to the artists who created the pieces of music 138, and (iv) information 144 related to the pieces of music and/or the artists. In other embodiments, the database 137 comprises less than or more than the data fields shown in FIG. 4.

The pieces of music field 138 may comprise, for example, MP3 files, .WAV files, etc. In another embodiment, the pieces of music are stored in a separate storage medium, such as compact discs, at the server site or away from the server site. If the pieces of music are stored at a different site than the server 104, the server 104 has access to the pieces of music or the server 104 can direct the transmission of the pieces of music.

The related information field 144 may include, for example, a music type or classification (e.g., hip hop, classical), song lyrics, sheet music or tablature, concert information, prices of the pieces of music, music videos, offers for selling apparel or memorabilia such as photographs, posters, bumper stickers, etc. Preferably, the system of the present invention allows a user to order and/or purchase such related merchandise and merchandise.

In one embodiment, the memory 136 comprises a plurality of smaller databases in addition to or instead of the database 137 shown in FIG. 4. Each smaller database may comprise music and/or information related to a particular type of music (e.g., Top 40 music, rap or hip hop, disco, dance, techno, hard rock, classic rock, classical, new wave, country music, etc.). In another embodiment, the smaller databases comprise male vocalists, female vocalists, instrumental, etc.

In FIG. 4, the memory 136 may further comprise hypertext markup language (HTML) files, common gateway interface (CGI) files, and/or Java applications for a web site user interface. A system web site can be provided so that users can operate the system (make music requests, etc.) over the Internet by using their home computers, portable wireless Internet devices (e.g. Palm Pilot, Sprint Wireless Web cell phone, etc.), the SPCD, or CTPU, if desired.

In FIG. 4, the wireless transceiver 152 is configured to transmit and/or receive data via a cellular system, a personal communication services (PCS) system, a satellite communication system, a packet radio system, and/or a mobile broadband system, among others. The data may comprise partial or complete pieces of music, requests for pieces of music or information related thereto, content delivery instructions, and other information.

In FIG. 4, the line or cable network interface 154 is configured to transmit and/or receive data via a line or cable network as described above with reference to FIG. 1. Those skilled in the art will understand that the server 104 may comprise only a wireless transceiver 152 or only a line or cable network interface 154. In the latter case, the server 104 can nevertheless receive transmissions that originate with or include a wireless segment. For example, a user may send a wireless transmission of a content request to an intermediate network node, the node being connected to a non-wireless network. The transmission could then proceed over the non-wireless network to the local server 104 and be received by the line or cable transceiver 154.

The User Identification Module

In FIG. 4, the user identification module 266 comprises firmware and/or hardware that identifies a user that transmits a command to the server 104. In one embodiment, the user identification module 266 is a 'caller-ID' unit that detects the user's telephone number. In other embodiments, the user identification module 266 may comprise other user identification methods instead of or in addition to a 'caller-ID' unit.

The Music Sample-Matching Module

There are at least two methods of identifying a piece of music. One method involves matching the sampled piece of music to a piece of music stored in the database 137. Another method involves reading one or more embedded codes or signals in the sampled piece of music to identify the sampled piece of music.

In the first method, the music sample-matching module 148 comprises firmware and/or hardware that compares a sampled piece of music from the user with pieces of music 138 stored in database 137 to find the closest match. For example, the sample-matching module 148 might compare a five- or ten-second sample of Led Zeppelin's "Stairway to Heaven" and find the complete song from database 137.

In one embodiment, the music sample-matching module 148 comprises a digital comparator circuit that compares a digitized sample of a piece of music from the user with a plurality of digitized pieces of music stored in the database 137. In one embodiment, the music sample-matching module 148 may further comprise filters to filter the sampled audio signal received from the user. The filters may be used to filter out noise or to separate the sampled piece of music from the user into individual audio signal patterns.

For example, in one embodiment, the comparator circuit uses the filters or other components to separate the sampled piece of music from the user into individual audio signals, such as vocals, drum, guitar, bass guitar, keyboard, etc. The comparator circuit may then process these individual audio signals in parallel and match them to audio signals of similar vocal (e.g., distinct pitch) or instrument type (e.g., guitar rifts of Jimmy Page, Jimi Hendrix) stored in the database 137. For example, the comparator may attempt to match a sampled drum signal to one or more stored drum signals while substantially simultaneously attempting to match a sampled guitar signal to one or more stored guitar signals. Parallel processing of different audio signals reduces the time necessary to identify the user-requested piece of music.

In the second method, the music sample matching module 148 scans the embedded code field 140 of the database 137 to find the music identification code of the piece of music requested by the user. If a piece of music does not have an embedded code or the embedded code is not found in the database 137, then the server 104 uses the first method described above.

In one embodiment, the two methods above are executed in combination at the same time to confirm the accuracy of a music match. Other music identification methods and apparatuses may be used in addition to or instead of the methods described herein.

Related Music Detection Module

In FIG. 4, the related music detection module 150 is configured to analyze a selected piece of music and find similar or related pieces of music stored in the database 137, according to various criteria. For example, the detection module 150 may search for music from the same artist, music with similar instruments, or music having a similar style, beat, rhythm, ethnic origin, time period, etc. Moreover, the detection module 150 may permit a user to select the criteria for similarity or relatedness. For example, the user can request music from the same artist, or music having a similar geographic origin, etc.

The Database Update Module

In FIG. 4, the database update module 258 allows a system operator, a user, or a music media manufacturer, such as Universal or Sony, to add new entries, delete existing entries or modify existing entries in the database 137.

General Operation of the Server

Figure 8:
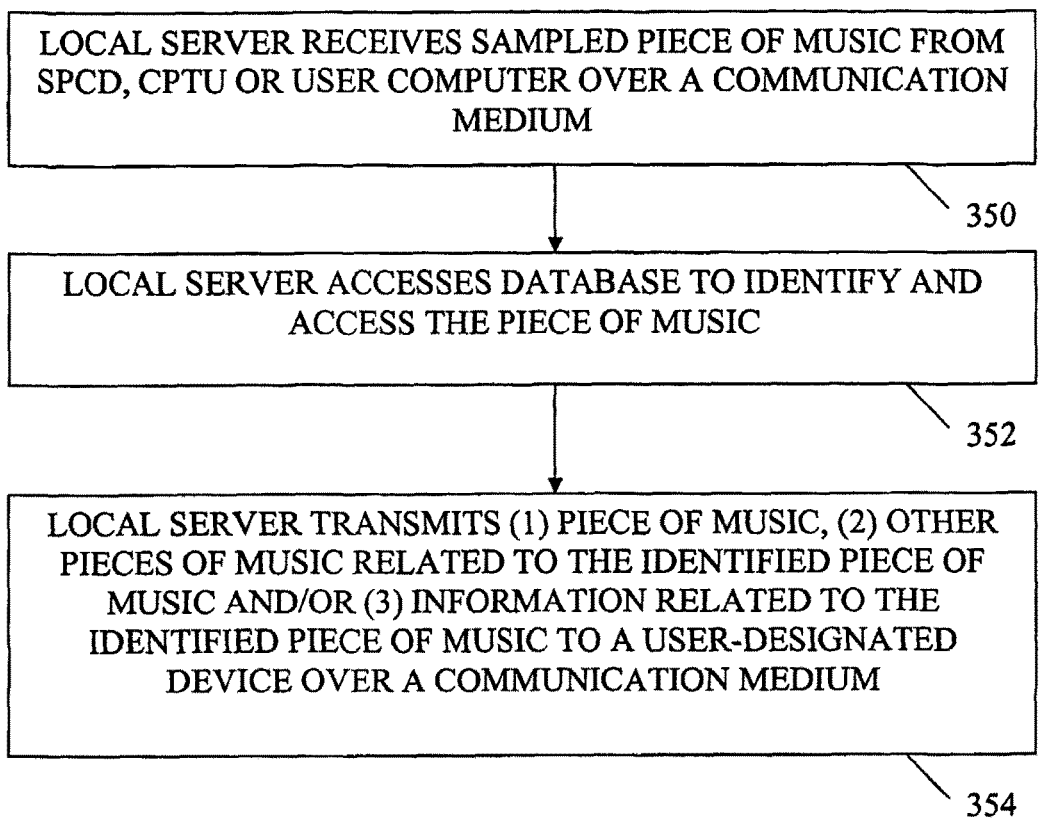
FIG. 8 illustrates one embodiment of a method of identifying and transmitting one or more pieces of music and/or information related to the one or more pieces of music.

FIG. 8 illustrates one embodiment of a method of identifying and transmitting one or more pieces of music and/or information related to the one or more pieces of music. In a start block 350, the local server 104 (FIG. 1) receives a user command or one or more sampled pieces of music from a SPCD 102 (or CTPU 108 or user computer 106) via a wireless or line or cable communication medium 200, 202, 204, 206, 208, 224 (FIG. 1). In a block 352, the sample matching module 148 (FIG. 4) uses one or both of the methods described above to identify and access the piece of music by scanning the database 137 to find the corresponding piece(s) of music.

In a block 354, the local server 104 transmits the identified piece(s) of music to a device specified by the user, such as a CTPU 108 or user computer 106. The local server 104 may also transmit other information stored in the database 137, such as the name of the artist(s), the title of the song, the name of the album, the music video of the piece of music to be stored or played on the TV set 188 coupled to the user computer 106 (FIG. 5) and/or any other requested information to the communication device(s) specified by the user. In one embodiment, the server 104 transmits the web site from the web site field 142 related to the piece of music to the user-designated device. The local server 104 may also use the related music detection module 150 to find other pieces of music related to the user-requested piece of music.

In one embodiment, the server 104 is configured to receive and process a plurality of user commands substantially simultaneously, i.e., substantially in parallel.

As stated above, the CTPU 108 or user computer 106 may be configured to perform the operations of the server 104. In other words, the CTPU 108 or user computer 106 has the software and/or hardware to process user commands, such as identifying a sampled piece of music and sending music, related music or information to a user-specified destination. In this embodiment, the SPCD 102 may simply send the sampled piece of music to the CTPU 108 or user computer 106.

The Content Transceiver Playback Units (CTPU)

The CTPUs 108 of the present invention are preferably configured to provide most or all of the above-described functionality of the SPCD 102. The CTPU 108 is further configured to play a piece of music via a built-in speaker or transfer the piece of music to an external stereo system 180, such as, for example, a vehicle stereo system, a home stereo system, or a portable handheld stereo system. In one embodiment, the CTPU 108 is larger than the SPCD 102 and comprises more memory and/or more features than the SPCD 102.

Figure 3:
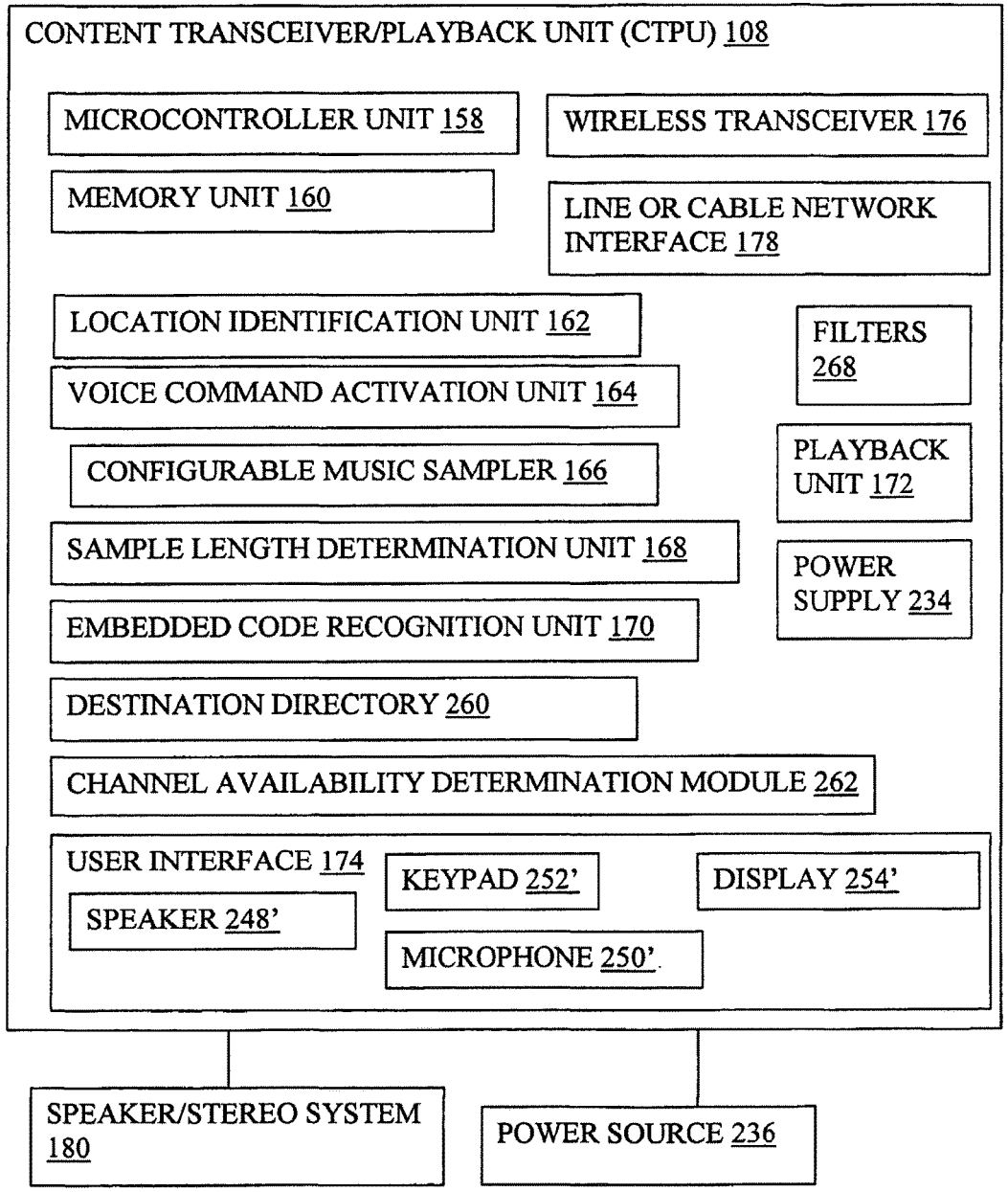
FIG. 3 illustrates one embodiment of a content transceiver/playback unit (CTBU) of FIG. 1.

FIG. 3 illustrates one embodiment of a CTPU 108 of the present invention. The CTPU 108 includes a microcontroller unit 158, a memory unit 160, a location identification unit 162, a voice command activation unit 164, a configurable music sampler 166, a sample length determination unit 168, an embedded code recognition unit 170, a destination directory 260, a channel availability determination module 262, a wireless transceiver 176, a line or cable network interface 178, a playback unit 172, a user interface 174, filters 268 and a power supply 234.

Some of the components and modules illustrated in FIG. 3 may be integrated or overlapped. The location identification unit 162, voice command activation unit 164, configurable music sampler 166, music sample length determination unit 168, embedded code recognition unit 170, destination directory 260, and channel availability determination module 262 may each comprise software, hardware or a combination of software and hardware. In other embodiments, the CTPU 108 may comprise other hardware components and software modules instead of or in addition to the components and modules shown in FIG. 3. In other embodiments, the CTPU 108 comprises less than all of the components shown in FIG. 3.

The microcontroller unit 158, memory unit 160, location identification unit 162, voice command activation unit 164, configurable music sampler 166, sample length determination unit 168, sample length determination unit 168, embedded code recognition unit 170, destination directory 260, channel availability determination module 262 user interface 174, filters 268 and power supply 234 are configured similarly to the corresponding units described above with regard to the SPCD 102 of FIG. 2. The wireless transceiver 176 and line or cable network (non-wireless) interface 178 are substantially similar to the wireless transceiver 152 and the line or cable network interface 154 of the above-described system server 104 (FIG. 4). As mentioned above, one embodiment of the CTPU 108 further comprises all of the components and functionality of the server 104.

The CTPU 108 may be integrated into or coupled to a variety of different devices, such as stereo systems and user computers. For example, the CTPU 108 may be integrated into or coupled to a vehicle stereo system, such as, for example, in an automobile, train, plane or boat. In addition or alternatively, the CTPU 108 may be integrated into or coupled to a home stereo system or a portable handheld stereo system, such as a Walkman or discman.

In one embodiment, the CTPU 108 is removably connectable to and interchangeable between such devices, such that it can be quickly and easily removed from a first device and connected to a second device. For example, in one embodiment, a user can remove a CTPU 108 coupled to a stereo system of a first vehicle from the first vehicle and couple the CTPU 108 to a stereo system of a second vehicle. Advantageously, music and other information stored in the memory unit 160 of the CTPU 108 are accessible in any automobile the user chooses to install the CTPU 108. In one embodiment, the CTPU 108 may operate in combination with a non-volatile memory within a vehicle that permanently stores pieces of music.

Preferably, the SPCD and CTPUs allow a network of users to identify, request, and deliver music to a variety of devices on the network. For example, suppose a user owns two vehicles, vehicle A and vehicle B, each having a stereo system. With reference to FIG. 1, suppose that the first CTPU 108A is integrated with the stereo system of vehicle A and the second CTPU 108B is integrated with the stereo system of vehicle B. The first CTPU 108A has a first device identification code, and the second CTPU 108B has a second device identification code. Also, the user uses the first user computer 106, which has a third device identification code. Suppose further that the user is driving vehicle A and listening to an FM radio broadcast of a piece of music. The user can transmit a request from the first CTPU 108A to the first local server 104 for the piece of music and/or information related to the piece of music. If desired, the user can instruct the first local server 104 to transmit the content to vehicle B by saying "SEND TO MY VOLVO" (vehicle B) or transmit the content to the first user computer 106 by saying "SEND TO MY PC." The CTPU 108A sends the second device identification code or the third device identification code to the server 104.

Suppose further that the user has a friend or relative driving a third automobile, automobile C, and that the third CTPU 108C is integrated with a stereo system of automobile C. The third CTPU 108C has a fourth device identification code. If desired, the user can instruct the first local server 104 to transmit the selected piece of music to automobile C by, for example, saying "SEND TO C'S CAR" or otherwise entering the fourth device identification code. The CTPU 108A sends the fourth device identification code to the server 104, and the server 104 downloads the music to the CTPU 108C with the fourth device identification code. Thus, the system 100 allows a network of users to conveniently transmit selected music or music-related content to one another as desired.

The system 100 is preferably configured to allow users to transmit content to one another, as described above, even when the users are located at significant distances from one another. For example, suppose the first user in the example above is located in Los Angeles, Calif. With reference to FIG. 1, suppose the first user would like to transmit selected content to a second user computer 112 and/or a fourth CTPU 114 which are both located in London, England. Suppose further that a second system server 110, configured similarly to the first server 104, is in communication with the second user computer 112 and the fourth CTPU 114. The first user can transmit a content request, for example, via the first CTPU 108A or the first user computer 106, to the first local server 104. The first user can also specify the destination (which the CTPU 108A or the server 104 translates into device identification code(s)) of the second user computer 112 and/or the fourth CTPU 114. In one embodiment, the first local server 104 transmits the user's content request over the Internet to the second local server 110 in London, England. The second server 110 then transmits the selected content to the desired destination device(s) 112, 114.

In one embodiment, the CTPU is integrated with a vehicle or home music receiver, such as a radio. The CTPU can be configured to automatically identify and/or sample songs played thereon and store such identifications in a temporary memory. Moreover, the CTPU can store a predetermined number of identifications. Every time a new song is played, the CTPU stores an identification of the new song and erases the least recently stored song identification in the temporary memory. The predetermined number can be any desired number. For example, the CTPU can be configured to store embedded codes or recorded samples of the prior 10 or 20 songs played thereon. Advantageously, the user can identify and request delivery of songs whose identifications are stored in the temporary memory.

The User Computer

Figure 5:
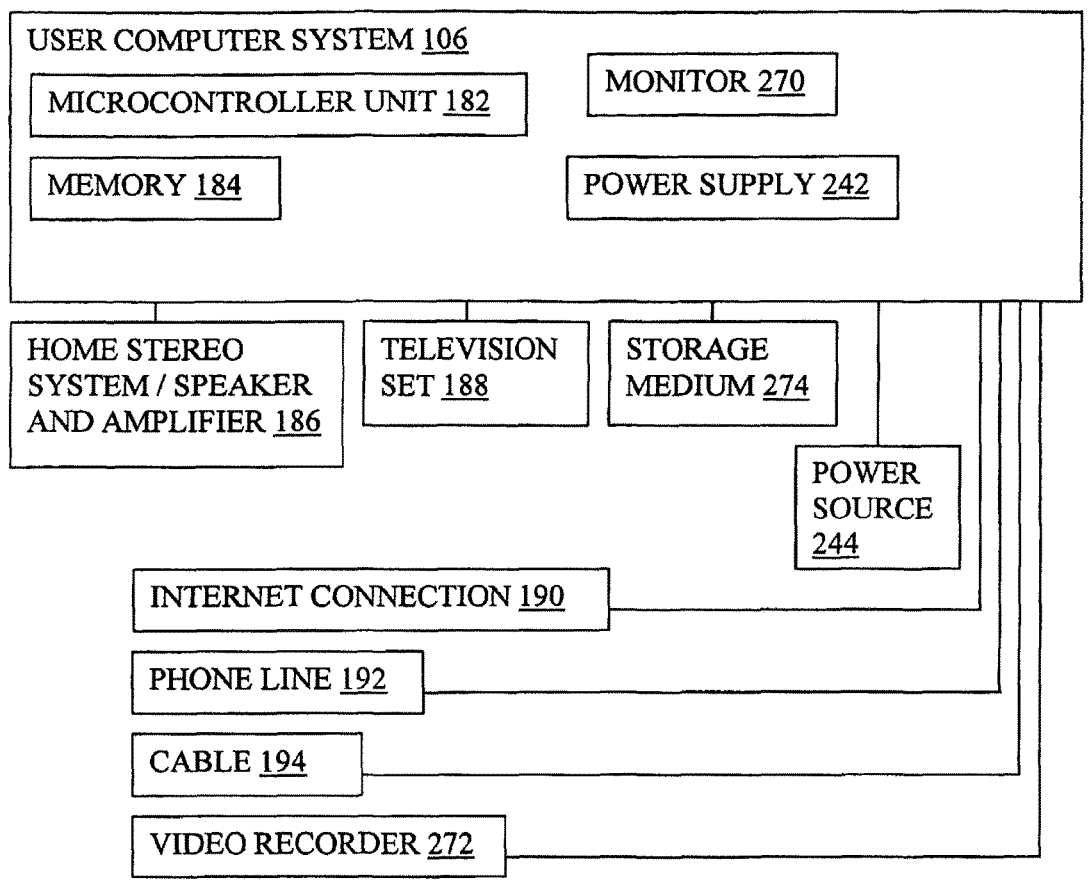
FIG. 5 illustrates one embodiment of a user computer of FIG. 1.

FIG. 5 shows one embodiment of a user computer 106. In FIG. 5, the computer 106 comprises at least a microcontroller unit 182, a memory 184, monitor 270 and a power supply 242. In one embodiment, the user computer 106 comprises most or all of the components of the CTPU 108. The user computer 106 may comprise a personal computer (PC), a laptop, an electronic organizer, such as a Palm Pilot, etc. The user computer 106 may be of the type manufactured by IBM, Compaq, Dell, Gateway, or Palm, Inc., etc.

In FIG. 5, the user computer 106 is preferably integrated with or connectable to a home stereo system 186, a television 188, an Internet connection 190, a telephone network connection 192, a cable television network connection 194, an additional storage medium 274 and a video recorder 272. In FIG. 5, the additional storage medium 274 may comprise disk drives, memory microchips, etc.

The user computer 106 may receive from the server 104 and display on the monitor 270 concert information, tour dates, ticket prices, album signing dates and locations, public appearances, new albums release dates, new music video release times and dates, and/or information on how to purchase t-shirts, hats, bumper stickers, etc. In one embodiment, the server 104 transmits a uniform resource locator (URL) of an Internet web site to the user computer 106, which the user can access via a standard web browser.

The user computer 106 may further receive from the server 104 and display lyrics and/or musical instrument sheets for guitar, plano/keyboard, drum, bass guitar, etc. In one embodiment, the user computer 106 is configured to teach the user how to play the piece of music with a musical instrument, such as displaying where to place the user's fingers on a guitar fret during the course of a piece of music.

In one embodiment, the user computer 106 allows a user to incorporate the pieces of music received from the server 104 into home videos from video recorder 272.

In one embodiment, the SPCD 102, CTPU 108 and user computer 10 are preferably configured to allow a user to easily transfer content stored on the memory units 118 and 160 (FIGS. 2 and 3), respectively, to the memory 184 of the user computer 106. Advantageously, the user can then transfer the music to a portable medium such as a compact disc, if desired.

Music Selection Information

In one embodiment, the SPCD 102, the user computer 106, and the CTPU 108 are configured to download music selection information, e.g., in the form of graphical user interface (GUI) menus or audio menus, from the first local server 104. The music selection information may comprise, for example, directories of music organized by artist, song titles, music styles or categories, etc. The user can download menus of music and select one or more pieces of music to be transmitted to a user-specified device. In FIG. 4, the first local server 104 includes a related music detection module 150 (FIG. 4) for providing optional music recommendations to the user, based upon various criteria as described above. For example, the recommended music may be similar in style or influence to that of the songs or artists that the user selects for downloading.

Limited Music Playback

The music delivery system 100 can be configured to provide the user with various options relating to the temporal availability or number of permitted uses of downloaded music. In one embodiment, the user can pay a reduced charge (as compared to, for example, the standard charge for downloading a piece of music) to download a piece of music for limited play duration. In other words, the system can limit the time within which the user can play the downloaded piece of music. For example, the user might only be able to play the piece of music for one week from the time of downloading. Preferably, the reception device (e.g., the CTPU or user computer) includes a timer module. When the user downloads the piece of music, the reception device records the time that the piece of music is received. When the user requests to play the piece of music, the timer module determines if the piece of music has been stored for longer than a preconfigured or user-specified time limit. If so, the timer module denies play of the piece of music and/or deletes the piece of music from the storage medium of the reception device. Advantageously, the user can pay a reduced charge for pieces of music of limited temporal availability.

In another embodiment, the user can pay a reduced charge to download a piece of music with a limited play number. In other words, the system can limit the number of times that a downloaded piece of music can be played. For example, the user might only be able to play the piece of music five times after downloading it. Preferably, the reception device (e.g., the CTPU or user computer) includes a counter module configured to keep track of the number of times each stored piece of music is played. Every time a downloaded piece of music is played, the counter module updates the record of the number of times that piece of music has been played. When the number of times the piece of music has been played reaches a preconfigured or user-specified number, the counter module deletes the piece of music from the storage medium of the reception device.

Music Identification Combined With Conventional Music Delivery

In one embodiment, the system 100 is configured such that a user can request to purchase selected music in a conventional form, such as a compact disc or cassette after the system 100 identifies and finds the sampled music. In this embodiment, the user's request for a particular song, compilation of songs, artist's album, or other request is transmitted to the first local server and stored therein. Preferably, a system administrator or computer monitors such requests and then conventionally (i.e., non-electronically) mails the requested media and content to an address provided by the user.

In addition, the system 100 may include a media production service as well. For example, suppose the user requests a compilation of songs that are not otherwise commercially available on a single compact disc or cassette. A media production service team or computer can compile the selected songs onto a compact disc or cassette and then mail it to the user.

The system 100 can be configured so that a user can request alternative versions of selected music, such as karaoke versions.

The system 100 can be configured so that when a user requests to transmit content to a communication device in the possession of a third party, the user can also request that a specialized email or e-greeting be sent to the third party's communication device, such as a SPCD 102, CTPU 108 or user computer 106.

Methods of Payment

In one embodiment, the system 100 charges the user's monthly mobile phone bill either a flat monthly fee, a fee for each user request, or some combination of the two. In one embodiment, the fees are charged to a user's credit card automatically. In one embodiment, the system 100 allows the user to select a method of payment.

Although this invention has been described with reference to music, those skilled in the art will readily appreciate from the teachings herein that the methods and apparatus described herein can be used for the identification, request, and delivery of any types of non-music audio signals, such as speeches, news reports, etc., and information related thereto. The methods and apparatus described herein can also be used for the delivery of video information and information related thereto.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:

1. A method for controlling acquisition of an audio signal by a computing system, the method comprising:
   receiving, via a microphone, at a first sensitivity level, a speech command;
   determining that non-speech audio including music will be observable by the microphone based, at least in part, on the speech command without receiving additional speech commands;
   in response to the determining:
      increasing a sensitivity for the microphone to a second sensitivity level for observing the non-speech audio including music;
      filtering ambient noise from a signal received from the microphone, at the second sensitivity level; and
      searching the filtered signal for the non-speech audio; and
   in response to identifying the non-speech audio in the filtered signal, matching a portion of the filtered signal to an identified audio pattern.

2. The method of claim 1 wherein the non-speech audio includes music in a form of at least one of whistling, humming, singing, drum beats, or sound produced by another musical instrument.

3. The method of claim 1 wherein filtering ambient noise from the signal received from the microphone comprises excluding, from the filtered signal, one or more of: talking, traffic sounds, or any combination thereof.

4. The method of claim 1 wherein receiving the speech command comprises receiving a voice command from a user.

5. The method of claim 4 wherein receiving the voice command from the user comprises receiving a pre-established spoken keyword or key-phrase established to cause the computing system to listen for the non-speech audio.

6. The method of claim 1,
   wherein increasing the sensitivity for the microphone comprises changing the sensitivity for the microphone to a level sufficient to detect music at least 20 feet away.

7. The method of claim 1 wherein filtering ambient noise from the signal further comprises applying one or more of: bandpass filters, low pass filters, high pass filters, anti-aliasing filters, or any combination thereof.

8. The method of claim 1 wherein matching the portion of the filtered signal to the identified audio pattern comprises:
   identifying words in the filtered signal; and
   comparing the identified words to previously identified words mapped to the identified audio pattern.

9. The method of claim 1, wherein the computing system comprises at least one of a mobile phone, a laptop computer, or a personal organizer.

10. The method of claim 1 wherein matching the portion of the filtered signal to the identified audio pattern is based in part on an identified location of the computing system.

11. The method of claim 1, wherein searching the filtered signal for the non-speech audio comprises:
   separating the filtered signal into multiple audio signals comprising a first audio signal pattern and a second audio signal pattern;
   comparing the first audio signal pattern to a first type of audio signal pattern in digital audio files of a database; and
   comparing a second audio signal pattern to a second type of audio signal pattern in the digital audio files of the database.

12. A computer-readable storage medium not constituting transitory propagating signals per se, the computer storage medium storing instructions that, when executed by a computing system, cause the computing system to perform operations for controlling acquisition of an audio signal, the operations comprising:
receiving, via a microphone, at a first sensitivity level, a speech command;
determining that non-speech audio including music will be observable by the microphone based, at least in part, on the speech command without receving additional speech commands, wherein the microphone is coupled to the computing system;
in response to the determining, increasing a sensitivity for the microphone to a second sensitivity level for for observing the non-speech audio including music;
further in response to the determining, filtering ambient noise from a signal received from the microphone, at the second sensitivity level; and
providing at least a portion of the filtered signal, wherein providing the portion of the filtered signal causes matching of the portion of the filtered signal to an identified audio pattern.

13. The computer-readable storage medium of claim 12 wherein matching the portion of the filtered signal to the identified audio pattern is based in part on an identified location of the computing system.

14. The computer-readable storage medium of claim 12 wherein filtering ambient noise from the signal received from the microphone comprises excluding, from the filtered signal, one or more of: talking, traffic sounds, or any combination thereof.

15. The computer-readable storage medium of claim 12 wherein receiving the speech command comprises receiving a voice command from a user that comprises a pre-established spoken keyword or key-phrase.

16. The computer-readable storage medium of claim 12 wherein matching the portion of the filtered signal to the identified audio pattern comprises:
identifying words in the filtered signal; and
comparing the identified words to previously identified words mapped to the identified audio pattern.

17. A computing system comprising
a memory;
one or more processors;
a transceiver; and
a microphone configured to receive audio;
wherein the one or more processors are configured to:
match speech audio received through the microphone, at a first sensitivity level, to a command, the command indicating that non-speech audio including music will be observable by the microphone; and
in response to matching the speech audio received through the microphone, at the first sensitivity, to the command:
increase a sensitivity for the microphone to a second sensitivity level for observing the non-speech audio including music; and
filter ambient noise from a signal received from the microphone; and wherein the transceiver is configured to transmit at least a portion of the signal received from the microphone, wherein transmitting the portion of the signal received from the microphone causes matching of the portion of the signal received from the microphone to an identified audio pattern.

18. The system of claim 17 wherein the one or more processors are further configured to determine that the command indicates that the non-speech audio will be observable by the microphone by determining that the speech audio received through the microphone includes a voice command that comprises a pre-established spoken keyword or key-phrase.

* * * * *